(12) United States Patent
Block et al.

(10) Patent No.: US 6,485,765 B1
(45) Date of Patent: Nov. 26, 2002

(54) LACTATIONAL PERFORMANCE OF DAIRY CATTLE

(75) Inventors: Elliot Block, Yardley, PA (US); William K. Sanchez, Tigard, OR (US); Kenneth R. Cummings, Skillman, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 09/563,443

(22) Filed: May 1, 2000

(51) Int. Cl.[7] .......................... A23K 1/175; A23K 1/08; A01N 31/00
(52) U.S. Cl. .......................... 426/74; 426/624; 514/706
(58) Field of Search .................... 426/74, 624; 514/706

(56) References Cited

U.S. PATENT DOCUMENTS

| | | |
|---|---|---|
| 4,888,185 A | 12/1989 | Miller |
| 5,360,823 A | 11/1994 | Griffel, Jr. et al. |
| 5,686,125 A | 11/1997 | Mueller |

OTHER PUBLICATIONS

Tucker et al., "Influence of Dietary Cation–Anion Balance on Milk, Blood, Urine, and Rumen fluid in Lactating Dairy Cattle", J. Dairy Sci., 71:346–354 (198.*

Delaquis and Block, "Dietary Cation–Anion Difference, Acid–Base Status, Mineral Metabolism, Renal Function, and Milk Production of Lactating Cows", Journal of Dairy Science, 78:2259–2284 (1995).*

W. K. Sanchez et al., "Interactions of Sodium, Potassium, and Chloride on Lactation, Acid–Base Status, and Mineral Concentrations", 1994, pp. 1661–1675, J. Dairy Sci, vol. 77, No. 6.

Annick M. Delaquis et al., "Dietary Cation–Anion Difference, Acid–Base Status, Mineral Metabolism, Renal Function, and Milk Production of Lactating Cows", 1995, pp. 2259–2284, J. Dairy Sci, vol. 78, No. 10.

J. W. West et al., "Effects of Potassium Carbonate and Sodium Bicarbonate on Rumen Function in Lactating Holstein Cows", 1987, pp. 81–90, J. Dairy Sci, vol. 70, No. 1.

Jerry K. Aikawa, "Magnesium: Its Bilogic Significance", CRC Press, Inc., pp. 85–86, Chapter 12, I, II and III.

* cited by examiner

*Primary Examiner*—Jose' G. Dees
*Assistant Examiner*—Robert DeWitty
(74) *Attorney, Agent, or Firm*—Stephen B. Shear

(57) ABSTRACT

This invention provides a feedstock for improving the lactational performance of dairy cows. An essential feature of the feedstock is a dietary cation-anion difference (DCAD) with a value between about 20–60 meq/100 g dietary DM. Other essential features of the feedstock are an atomic ratio of potassium:sodium between about 1–5:1, and a weight ratio of potassium:magnesium between about 3–5:1.

17 Claims, 3 Drawing Sheets

LACTATIONAL PERFORMANCE OF DAIRY CATTLE

BACKGROUND OF THE INVENTION

This invention generally relates to macromineral dietary factors with respect to ruminant nutrition. More specifically this invention relates to the effect of dietary cation-anion difference (DCAD) on the health and lactational performance of dairy cattle.

Dietary macromineral elements are necessary for proper health and productive performance of lactating dairy cows. As a class of nutrients, these elements have been the subject of extensive research, and considerable information exists about individual effects of each micromineral element. Information on interrelationships of macromineral elements in diets for lactating dairy cows is relatively limited.

An early publication was the first to propose that mineral interrelations were related to acid-base status [J. Biol. Chem., 58, 235 (1922)]. It was proposed further that maintenance of normal acid-base equilibrium required excretion of excess dietary cations and anions. It was hypothesized that consumption of either excess mineral cations relative to anions or excess anions relative to cations resulted in acid-base disturbances in animals (A. T. Shohl. Mineral Metabolism. Reinhold Publishing Corp., New York. 1939).

Once animal nutritionists began to test this hypothesis, mineral interrelationships were found to affect numerous metabolic processes, and there was evidence that mineral interrelationships had profound influences. It was theorized that for an animal to maintain its acid-base homeostasis, input and output of acidity had to be maintained. It was shown that net acid intake was related to the difference between dietary cations and anions. The monovalent macromineral ions Na, K and Cl were found to be the most influential elements in the interrelationship (P. Mongin. Page 1, Third Ann. Int. Mineral Conf. Orlando, Fla. 1980).

Nutrient metabolism in animals results in the degradation of nutrient precursors into strong acids and bases. In typical rations fed to dairy cattle, inorganic cations exceed dietary inorganic anions by several milliequivalents (meq) per day. Carried with excess dietary inorganic cations are organic anions which can be combusted to $HCO_3^-$. Consequently, a diet with excess inorganic cations relative to inorganic anions is alkaline, and a diet with excess inorganic anions relative to cations is acidogenic.

Chloride is the most acidogenic element to be considered. An excess of dietary chloride can lead to a respiratory and/or metabolic acidosis. This is critical in ruminant nutrition because of salt (NaCl) feeding both in the diet and on an ad libitum basis. The acidogenic influence of chloride can be negated by sodium and potassium which are alkalogenic elements. Conversely, excess intake of sodium or potassium can induce metabolic alkalosis.

Blood pH ultimately is determined by the number of cation and anion charges absorbed in the blood. If more anions than cations enter the blood from the digestive tract, blood pH will decrease. It was proposed that a three-way interrelationship among dietary Na, K and Cl, i.e., the sum of Na plus K minus Cl [in meq per 100 g diet of dry matter (DM)], could be used to predict net acid intake. The term "dietary cation-anion difference (DCAD)" was coined to represent the mathematical calculation (W. K. Sanchez and D. K. Beede. Page 31, Proc. Florida Rum. Nutr. Conf. Univ. of Florida. 1991). Expressed in its fullest form, DCAD is written as follows:

$$meq[(Na^++K^++Ca^{+2}+Mg^{+2})-(Cl^-+SO_4^{-2}+PO_4^{-3})]/100 \text{ g of dietary dry matter (DM)}.$$

A problem with including the multivalent macrominerals (Ca, Mg, P and S) in the DCAD expression for ruminants relates to the variable and incomplete bioavailability of these ions compared to Na, K and Cl. The expression employed most often in non-ruminant nutrition is the monovalent cation-anion difference:

$$meq(Na^++K^+-Cl^-)/100 \text{ g dietary DM}$$

Because of the additional use of sulfate salts in prepartum rations, the expression that has gained most acceptance in ruminant nutrition is as follows:

$$meq(Na^++K^+)-(Cl^-+SO_4^{-2})/100 \text{ g dietary DM}$$

For a calculation, mineral concentration are first converted to milliequivalents:

$$meq/100 \text{ g} = \frac{\text{(milligrams) (valence)}}{\text{(g atomic weight)}}$$

The following illustrates a calculation of the meq Na+K−Cl−S value of a diet with 0.18% Na, 1.0% K, 0.25% Cl and 0.2% S. There are 180 mg Na (0.18%=0.18 g/100 g or 180 mg/100 g), 1000 mg K (1.0% K), 250 mg Cl (0.25% Cl) and 200 mg S (0.2% S) per 100 g dietary DM. The $SO_4^-$ entity is calculated as atomic sulfur.

$$meq \text{ Na} = \frac{(180 \text{ mg}) (1 \text{ valence})}{(23 \text{ g atomic weight})} = 7.8 \text{ meq Na}$$

$$meq \text{ K} = \frac{(1000 \text{ mg}) (1 \text{ valence})}{(39 \text{ g atomic weight})} = 25.6 \text{ meq K}$$

$$meq \text{ Cl} = \frac{(250 \text{ mg}) (1 \text{ valence})}{(35.5 \text{ g atomic weight})} = 7.0 \text{ meq Cl}$$

$$meq \text{ S} = \frac{(200 \text{ mg}) (2 \text{ valence})}{(32 \text{ g atomic weight})} = 12.5 \text{ meq S}$$

The calculated DCAD value is as follows:

$$meq(Na+K-Cl-S)=7.8+25.6-7.0-12.5=13.9 \text{ meq}/100 \text{ g dietary DM}$$

A simpler expression is as follows:

$$DCAD=(0.18\% \text{ Na}/0.023)+(1.0\% \text{ K}/0.039)-(0.25\% \text{ Cl}/0.0355)-(0.2\% \text{ S}/0.016)=+13.9 \text{ meq}/100 \text{ g dietary DM}$$

A study was conducted which was designed specifically to evaluate the effect of DCAD on acid-base status and lactational performance of dairy cattle. Diets formulated with −10, 0, +10 or +20 DCAD were compared. A diet with +20 improved dry matter intake (DMI) 11% and milk yield (MY) 9% compared with a −10 DCAD diet. Blood bicarbonate ($HCO_3^-$) increased linearly with increasing DCAD, which indicated an improvement in acid-base status with high DCAD compared with low DCAD. It was concluded that responses to increasing DCAD were independent of specific Na, K and Cl effects [J. Dairy Sci., 71, 346 (1988)].

Another study evaluated the influence of Na, K and Cl at constant DCAD. Diets were formulated to provide +32 DCAD in (1) a basal diet adequate in dietary Na, k and Cl; (2) a basal diet containing an additional 1.17% NaCl; and (3) a basal diet containing an additional 1.56% KCl. Fifteen midlactation cows were assigned to replicated 3×3 Latin squares. The KCl-fed cows consumed more DM and had a lower milk fat percentage than NaCl-fed cows, but there were no differences in milk yield. It was concluded that dietary DCAD was a more important determinant of dietary impact on systemic acid-base status than actual dietary concentrations of Na, K and Cl [(J. Dairy Sci., 73, 3485 (1990)].

An extensive study was conducted with 48 cows and 15 dietary treatments to investigate lactational and acid-base responses to DCAD as [(Na+K)−(Cl+S)]. DCAD ranged from 0 to +50 [(Na+K)−(Cl+S)]/100 g dietary DM. The basal diet was 54.5% concentrate, 5.5% cottonseed hulls, and 40% corn silage (DM basis). Dry matter intake (DMI) and milk yield (MY) was highest when DCAD was between +17 to +38, and +25 to +40, respectively [J. Dairy Sci., 77, 1661 (1994)].

In another study three switchback experiments were conducted with 12 cows each in early, mid or late lactation. Increasing DCAD from +5.5 to +25.8 in early lactation, and from +14 to +37.3 in midlactation, increased DMI and milk production. These effects were not observed in late lactation with either +20 or +37.5 DCAD. The study results supported the concept that response to DCAD is affected by stages of lactation [J. Dairy Sci., 78, 2259 (1995)].

The cumulative DCAD studies also have indicated that dietary K has a unique role, particularly during heat stress in dairy cows. When potassium carbonate was the source of dietary K, a linear response to dietary K in heat stressed dairy cows was observed. Every 1% increase in K raised fat-corrected milk by 8.9 lbs/day [J. Dairy Sci., 69, 124 (1986); 70, 81 (1987); and 70, 309 (1987)].

The reported studies have established the DCAD concept as an important factor in diet regimen for dairy cows. There are contradictions in the overall DCAD data reported in the literature, so that salient DCAD considerations are incentive for continued investigation.

Accordingly, it is an object of this invention to provide a method for improving the lactational performance of dairy cows.

It is another object of this invention to provide a method for DCAD control to increase the dry matter intake (DMI) of lactating dairy cows.

It is another object of this invention to provide a method for DCAD control to increase the milk yield (MY) of lactating dairy cows.

It is a further object of this invention to provide a method for DCAD control to increase the blood bicarbonate ($HCO_3^-$) of lactating dairy cows.

Other objects and advantages of the present invention shall become apparent from the accompanying description and example.

DESCRIPTION OF THE INVENTION

One or more objects of the present invention are accomplished by the provision of a method for improving the lactational performance of a dairy cow which comprises feeding a lactating cow with a feedstock having a prescribed content of macromineral nutrients; wherein the relative proportions of macrominerals in the feedstock are defined as a dietary cation-anion difference (DCAD) which corresponds to the equation:

$$DCAD = meq(Na^+ + K^+) - (Cl^- + SO_4^{-2})/100 \text{ g dietary DM}$$

where meq is milliequivalents, Na is sodium cations, K is potassium cations, Cl is chloride anions, $SO_4$ is sulfate anions, and DM is dry matter; wherein DCAD has a value between about 20–60 meq/100 g dietary DM, and the atomic ratio of potassium:sodium in the feedstock is between about 1–5:1; and wherein the feedstock has a weight ratio of potassium:magnesium between about 3–5:1.

Figure 1:
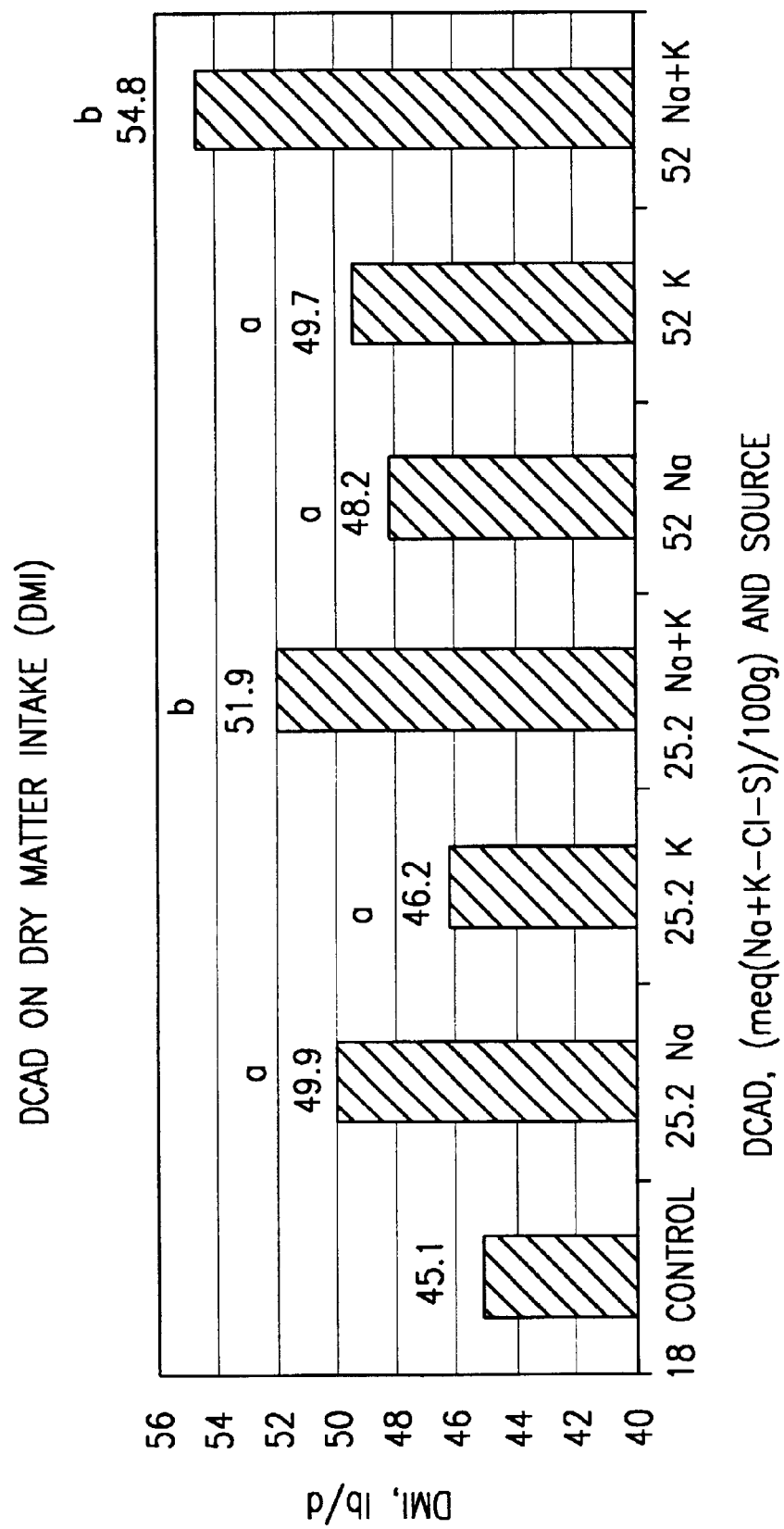
FIG. 1 is a graph illustrating dry matter intake (DMI) versus dietary cation-anion difference (DCAD) in the early lactation phase of dairy cows during a feed regimen having a prescribed content of macrominerals in accordance with the practice of the present invention as described in the Example.
Figure 2:
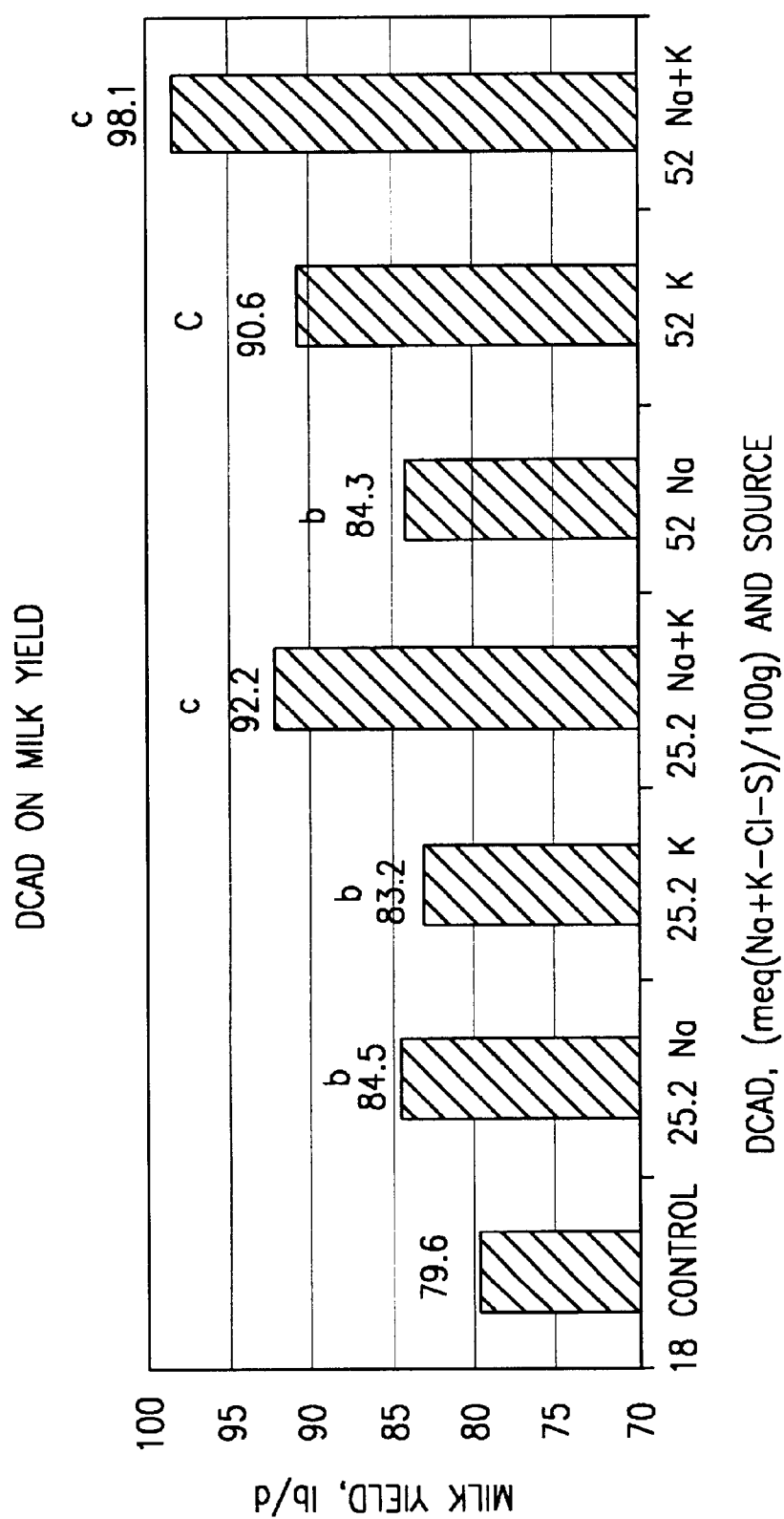
FIG. 2 is a graph illustrating milk yield (MY) versus dietary cation-anion difference (DCAD) in the early lactation phase of dairy cows during a feed regimen having a prescribed content of macrominerals in accordance with the practice of the present invention as described in the Example.
Figure 3:
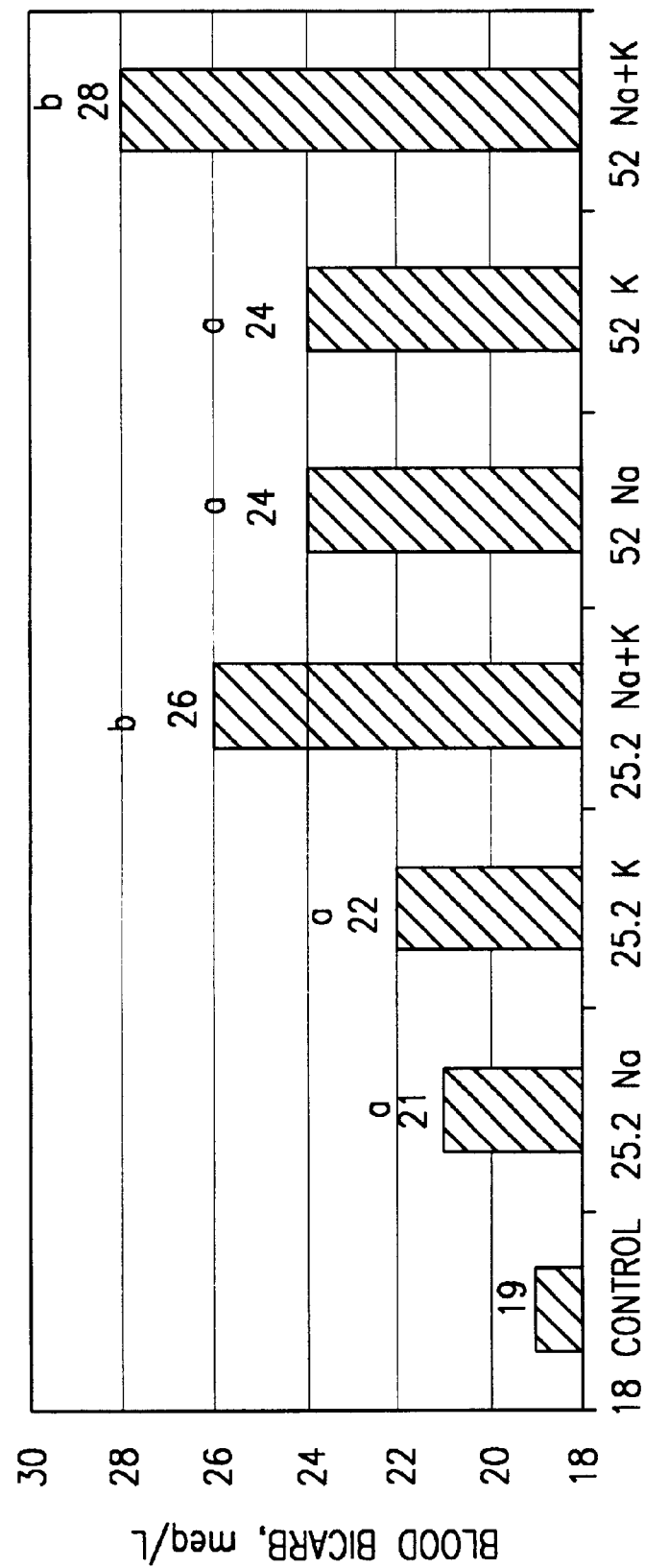
FIG. 3 is a graph illustrating blood bicarbonate ($HCO_3^-$) versus dietary cation-anion difference (DCAD) in the early lactation phase of dairy cows during a feed regimen having a prescribed content of macrominerals in accordance with the practice of the present invention as described in the Example.

As demonstrated in the Example and as summarized in FIGS. 1–3, an important aspect of the present invention is a feed regimen for lactating dairy cows which has a prescribed content of macrominerals within a specified DCAD meq range, and which has a specified atomic ratio of potassium and sodium. The presence of both potassium and sodium in a feedstock is an essential feature of the present invention, as demonstrated in the Example.

As a further aspect, the beneficial response to the invention feed regimen for lactating dairy cows, with a specified ratio of potassium:sodium, points to the unique role of dietary potassium, particularly during heat stress. Milk is higher in potassium than calcium, and a heat stressed dairy cow often is potassium deficient. For optimal lactation performance, an essential weight ratio balance must be maintained between potassium and magnesium cations.

In the practice of the present invention, an optimal increase in dry matter intake (DMI) is obtained when the DCAD value is between about 20–38 meq/100 g dietary DM. An optimal increase in milk yield (MY) is obtained when the DCAD value is between about 25–40 meq/100 g dietary DM. An optimal increase in blood bicarbonate is obtained when the DCAD value is between about 30–52 meq/100 g dietary DM.

In a further embodiment the present invention provides a feedstock for improving the lactational performance of dairy cows which comprises a supplemented basal ration having a prescribed content of micromineral nutrients; wherein the relative proportions of macrominerals in the feedstock are defined as a dietary cation-anion difference (DCAD) which corresponds to the equation:

$$DCAD = meq(Na^+ + K^+) - (Cl^- + SO_4^{-2})/100 \text{ g dietary DM}$$

where meq is milliequivalents, Na is sodium cations, K is potassium cations, Cl is chloride anions, $SO_4$ is sulfate anions, and DM is dry matter; wherein DCAD has a value between about 20–60 meq/100 g dietary DM, and the atomic ratio of K:Na in the feedstock is between about 1–5:1; and wherein the feedstock has a weight ratio of potassium:magnesium between about 3–5:1. A preferred weight ratio of potassium:magnesium is between about 3.4–4.6:1.

A present invention macromineral prescription is administered in a conventional feedstock of the type developed for lactating cows. Typical feedstocks are basal rations as described in publications such as J. Dairy Sci., 77, 1437 (1994); 77, 1661 (1994); and 77, 3096 (1994); incorporated by reference.

Macrominerals can be selected from the group consisting of sodium bicarbonate, sodium carbonate, sodium sesquicarbonate, sodium chloride, sodium sulfate, sodium phosphate and potassium bicarbonate, potassium carbonate, potassium chloride, potassium sulfate and potassium phosphate. Magnesium cations can be provided in the form of magnesium oxide, magnesium chloride, magnesium sulfate, and the like.

A feedstock for lactating cows will be varied over the lactation cycle. A typical feedstock will include silage, and energy concentrate and protein concentrate. A basal feedstock can comprise 6.4 kg corn silage (35% dry matter), 17 kg alfalfa silage (50% dry matter), 1 kg alfalfa hay, and 6.9 kg energy and 2.1 kg protein concentrate.

The compositions of an energy concentrate and a protein concentrate are illustrated in TABLE I.

TABLE I

|  | Weight, % |
|---|---|
| ENERGY CONCENTRATE | |
| Ground shelled corn | 56.87 |
| Ground ear corn | 34.50 |
| Molasses | 2.00 |
| Animal/vegetable fat | 1.00 |
| Minerals and vitamins | 5.63 |
| PROTEIN CONCENTRATE | |
| Soybean meal - 44% | 60.88 |
| Soybran hulls | 26.20 |
| Molasses | 1.00 |
| Fish meal | 3.90 |
| Animal/vegetable fat | 1.00 |
| Sodium bicarbonate | 3.90 |
| Magnesium oxide | 0.92 |

One or more other ingredients can be incorporated in a present invention feedstock composition, such as biologically active derivatives An optional biologically active ingredient can be included in a feedstock in an effective quantity between about 0.05–20 weight percent, based on the weight of feedstock. It can be selected from a broad variety of nutrients and medicaments, either as a single component or as a mixture of components, which are illustrated by the following listing of active species:

1. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

| Protein | 12.0% |
|---|---|
| Fat | 0.7% |
| Lactose | 60.0% |

-continued

| Phosphorus | 0.79% |
|---|---|
| Calcium | 0.874% |
| Ash | 9.7% |

Another source of carbohydrate is derived from the pulp and paper industry which produces large quantities of byproduct lignin sulfonates from wood during the sulfite pulping process. The carbohydrate byproduct is a constituent of the spent sulfite liquor.

2. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs and salts thereof.

3. vitamin ingredients either singly or in combination which include thiamine HCl, riboflavin, pyridoxine HCl, niacin, niacinamide, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, silicon, vanadium and selenium.

4. protein ingredients as obtained from sources such as dried blood or meat meal, dried and sterilized animal and poultry manure, fish meal, liquid or powdered egg, fish solubles, cell cream, soybean meal, cottonseed meal, canola meal, and the like.

Protein ingredients include non-protein nitrogen compounds such as urea, biuret, ammonium phosphate, and the like.

5. antioxidants as illustrated by butylated hydroxyanisole, butylated hydroxytoluene, tocopherol, tertiary-butylhydroquinone, propyl gallate, and ethoxyquin; and suitable preservatives include sodium sorbate, potassium sorbate, sodium benzoate, propionic acid, α-hydroxybutyric acid, and the like.

6. suspension stabilizing agents which preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxyethylene glycol phosphate esters; gum arabic; carob bean gum; tragacanth gum; ammonium, sodium, potassium and calcium alginates; glycol alginates; xanthan gum; potato agar; alkylcellulose; hydroxyalkylcellulose; carboxyalkylcellulose; and the like.

The feedstock initially is metabolized in the rumen of cattle and other ruminants. The rumen contains microorganisms, such as bacteria and protozoa, which break down complex compounds ingested by the animal via a fermentation process.

The present invention further contemplates the provision of feedstock supplements which have varied weight ratios of rumen-available macromineral ingredients to facilitate formulation of feedstocks with a target DCAD and required K:Na and K:Mg proportions.

| Macromineral Supplements | |
|---|---|
| | Parts by Weight |
| Sodium-containing ingredient | 30–60 |
| Potassium-containing ingredient | 20–60 |
| Magnesium-containing ingredient | 5–25 |

A macromineral supplement can be in the form of powder, granules, pellets, or the like. A supplement can contain other ingredients such as a binder, or an active agent such as nonprotein nitrogen.

In a further embodiment, a supplement can have controlled-release properties. This is illustrated by a supplement which is composed of coated particles of a core matrix of macrominerals which comprise the above described sodium, potassium and magnesium ingredient weight ratios. A nonprotein nitrogen ingredient such as urea can be included in a quantity up to about 80 weight percent of the core matrix of the coated particles. The coating can be of the type described in publications such as U.S. Pat. Nos. 3,413,118 and 5,803,946; incorporated by reference. A selected coating, such as polyvinyl acetate, has rumen-degradable properties.

The macrominerals in an invention feedstock have significant metabolic interrelationships relative to the health and lactational performance of dairy cattle. Animal trials have indicated that a magnesium deficiency results in failure to retain potassium, which can lead to a potassium deficiency. Also, excessive levels of potassium interfere with magnesium absorption. Because sodium and potassium must be in balance, excessive use of salt depletes an animal's potassium supply (pages 99–104. Feeds & Nutrition. Second edition, Ensminger Publishing Co., 1990).

Clinical studies have provided evidence that magnesium is essential for keeping the intracellular potassium constant. Dietary deprivation of magnesium is accompanied by muscle potassium deficit despite an abundant supply of potassium. In animal studies, a diet depleted of potassium caused a significant hypokalemia and hypermagnesemia, a diuresis and natriuresis, a magnesiuria, and a decrease in the fecal excretion of magnesium (Chapter 12. Magnesium: Its Biological Significance. CRC Press, Inc., Boca Raton, Fla.).

"Nutrient Requirements of Dairy Cattle" (1989) by the National Research Council lists recommended nutrient content of diets for dairy cattle (Table 6–5, page 87). For early lactation, the recommended diet contents are 0.18% sodium, 1% potassium, and 0.25% magnesium (DM basis). Under conditions of heat stress, potassium can be increased to 1.2%; and under conditions conducive to grass tetany, magnesium can be increased to 0.3% to satisfy distress macromineral requirements.

The following Example is further illustrative of the present invention. The components and specific ingredients are presented as being typical, and various modifications can be derived in view of the foregoing disclosure within the scope of the invention.

EXAMPLE

This Example illustrates the improved lactational performance of dairy cows which are fed in accordance with the present invention.

Seventy Holstein dairy cows were randomly assigned at calving to receive one of seven postpartum treatments beginning at 7 days postpartum through day 70 of lactation. The basal diet was formulated to meet or exceed NRC requirements for protein, energy, UIP, DIP, NDF, vitamins and minerals. The diet contained (DM basis) a 50:50 forage:concentrate ratio with 80% of the forage from corn silage and 20% from a mixed legume-grass haylage (DM basis). The concentrate portion of the diet was composed of high moisture ear corn and a commercial supplement containing corn, barley, soybean meal, distiller's grains, fishmeal and blood meal.

The basal diet was formulated to contain a dietary cation-anion difference (DCAD) of +15.5 meq/100 g DM with DCAD calculated as meq(Na+K)−(Cl+S). Of the seven treatments, one was the basal diet, three had DCAD adjusted to +30.0 meq/100 g DM using either Na from sodium bicarbonate, K from potassium carbonate or a 50:50 (weight basis) mixture of each, and the remaining three diets had their DCAD adjusted to +60.0 meq/100 g DM by the same method as the +30.0 DCAD diets. The actual DCAD analyses of the diets were +18.0, +25.2 and +52.0 meq/100 g DM for the formulated basal, +30.0 and +60.0 for the DCAD diets. The basal diet contained no additional sodium bicarbonate or potassium carbonate.

All diets were offered as total mixed rations (TMR) delivered twice daily to assure a minimum of 10% of the total daily allotment as refusals the next day. Refusals were weighed and recorded daily prior to the morning feeding. The diets were offered within the first six days postpartum and measurements commenced on day 7 postpartum.

Rations were sampled weekly for DM analysis, and composited monthly for nutrient analysis. Milk was sampled weekly where AM/PM samples were proportionally composited for fat and protein analysis by the Quebec milk-recording laboratory. Venous blood was sampled by tail venipuncture once per week for pH and bicarbonate analysis.

Measurements were daily feed intake and milk production (2 times/day milking) and weekly milk analysis, blood pH and blood bicarbonate.

The collected data are summarized in FIGS. 1–3. The different superscripts ($^{a,b,c}$) indicate a statistical difference between control and treatment means where a=P<0.1, b=P<0.05 and c=P<0.01.

FIG. 1 is a graph illustrating dry matter intake (DMI) versus dietary cation-anion difference (DCAD) in the early lactation phase of the tested dairy cows. The FIG. 1 data demonstrate that the highest DMI was obtained with the +52 diet having a K:Na ratio of 50:50 (weight basis).

The FIG. 2 data demonstrate that the highest milk yield was obtained with the +52 DCAD diet having a K:Na ratio of 50:50 (weight basis).

The FIG. 3 data demonstrate that the highest blood bicarbonate was obtained with the +52 DCAD diet having a K:Na ratio of 50:50 (weight basis).

Similar results are obtained when DCAD is in the range of 20–60 meq/100 g dietary DM, the K:Na atomic ratio in the range of 1–5:1, and the K:Mg weight ratio is in the range of 3–5:1.

A preferred DCAD is between about 25–55 meq/100 g dietary DM, a preferred K:Na atomic ratio is between about 1.5–4:1, and a preferred K:Mg weight ratio is between about 3.4–4.6:1.

Practice of the invention embodiments is most beneficial to dairy cattle during the 12–15 months early lactation stage. Typically the feedstock formulations are adjusted to achieve a target DCAD in the range of about 25–55 meq/100 g dietary DM. Reformulations are facilitated by blending a particular type of dietary ration with a customized macromineral supplement weight ratio:

Macromineral Supplements

|  | Parts by Weight | | |
| --- | --- | --- | --- |
| Sodium bicarbonate and/or Sodium sesquicarbonate | 50 | 45 | 40 |
| Potassium carbonate | 40 | 40 | 40 |
| Magnesium oxide | 10 | 15 | 20 |

The practice of the present invention as illustrated above provides improved health and lactational performance of lactating cows.

What is claimed is:

1. A method for improving the lactational performance of a dairy cow which comprises feeding a lactating cow with a feedstock having a prescribed content of macromineral nutrients; wherein the relative proportions of macrominerals in the feedstock are defined as a dietary cation-anion difference (DCAD) which corresponds to the equation:

$$DCAD = meq(Na^+ + K^+) - (Cl^- + SO_4^{-2})/100 \text{ g dietary DM}$$

where meq is milliequivalents, Na is sodium cations, K is potassium cations, Cl is chloride anions, $SO_4$ is sulfate anions, and DM is dry matter; wherein DCAD has a value between about 20–60 meq/100 g dietary DM, and the atomic ratio of potassium:sodium in the feedstock is between about 1–5:1; and wherein the feedstock has a weight ratio of potassium:magnesium between about 3–5:1.

2. A method in accordance with claim 1 wherein the DCAD macrominerals are selected from the group consisting of sodium bicarbonate, sodium carbonate, sodium sesquicarbonate, sodium chloride, sodium sulfate, sodium phosphate, potassium bicarbonate, potassium carbonate, potassium chloride, potassium sulfate and potassium phosphate.

3. A method in accordance with claim 1 wherein the magnesium ingredient comprises magnesium oxide.

4. A method in accordance with claim 1 wherein feedstock is administered to the dairy cow during the early or mid-lactation phase.

5. A method in accordance with claim 1 wherein the DCAD value is between about 20–38 meq/100 g dietary DM, and the beneficial effect is increased dry matter intake (DMI).

6. A method in accordance with claim 1 wherein the DCAD value is between about 25–40 meq/100 g dietary DM, and the beneficial effect is increased milk yield (MY).

7. A method in accordance with claim 1 wherein the DCAD value is between about 30–52 meq/100 g dietary DM, and the beneficial effect is increased blood bicarbonate.

8. A feedstock for improving the lactational performance of dairy cows which comprises a supplemented basal ration having a prescribed content of micromineral nutrients; wherein the relative proportions of macrominerals in the feedstock are defined as a dietary cation-anion difference (DCAD) which corresponds to the equation:

$$DCAD = meq(Na^+ + K^+) - (Cl^- + SO_4^{-2})/100 \text{ g dietary DM}$$

where meq is milliequivalents, Na is sodium cations, K is potassium cations, Cl is chloride anions, $SO_4$ is sulfate anions, and DM is dry matter; wherein DCAD has a value between about 20–60 meq/100 g dietary DM, and the atomic ratio of potassium:sodium in the feedstock is between about 1–5:1; and wherein the feedstock has a weight ratio of potassium:magnesium between about 3–5:1.

9. A feedstock in accordance with claim 8 wherein the atomic ratio of potassium:sodium in the feedstock is between about 1.54:1, and the weight ratio of potassium:magnesium in the feedstock is between about 3.4–4.6:1.

10. A feedstock in accordance with claim 8 wherein the DCAD macrominerals are selected from the group consisting of sodium bicarbonate, sodium carbonate, sodium sesquicarbonate, sodium chloride, sodium sulfate, sodium phosphate, potassium bicarbonate, potassium carbonate, potassium chloride, potassium sulfate and potassium phosphate.

11. A feedstock in accordance with claim 8 wherein the magnesium ingredient comprises magnesium oxide.

12. A dietary supplement for incorporation in ruminant feedstock to improve the lactational performance of dairy cows, wherein the supplement is adapted to provide sodium, potassium and magnesium cations in calculated proportions to a basal ration, whereby the resultant macromineral specifications meet the requirements of a feedstock in accordance with claim 8.

13. A dietary supplement for incorporation in ruminant feedstock, wherein the supplement is adapted to provide sodium, potassium and magnesium cations in calculated proportions to a basal ration, and wherein the supplement content comprises the following parts by weight of macrominerals:

| | |
| --- | --- |
| Sodium bicarbonate and/or Sodium sesquicarbonate | 30–60 |
| Potassium carbonate | 20–60 |
| Magnesium oxide | 5–25 |

14. A dietary supplement in accordance with claim 13 which exhibits controlled-release properties under rumen-incubation conditions.

15. A dietary supplement in accordance with claim 12 which exhibits controlled-release properties under rumen-incubation conditions.

16. A dietary supplement in accordance with claim 15 which has a content of non-protein nitrogen.

17. A dietary supplement in accordance with claim 15 which has a content of urea.

* * * * *